United States Patent
Vänttinen et al.

(10) Patent No.: US 10,653,982 B2
(45) Date of Patent: May 19, 2020

(54) VACUUM BOX, BELT FILTER, METHODS FOR SERVICING A VACUUM BELT FILTER, METHOD FOR LIQUID-SOLID SEPARATION OF A SLURRY, AND FILTER ELEMENT

(71) Applicant: OUTOTEC (FINLAND) OY, Espoo (FI)

(72) Inventors: Kari Vänttinen, Espoo (FI); Mika Illi, Vantaa (FI); Bjarne Ekberg, Turku (FI)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 15/771,540

(22) PCT Filed: Nov. 2, 2016

(86) PCT No.: PCT/FI2016/050768
§ 371 (c)(1),
(2) Date: Apr. 27, 2018

(87) PCT Pub. No.: WO2017/077186
PCT Pub. Date: May 11, 2017

(65) Prior Publication Data
US 2018/0361280 A1     Dec. 20, 2018

Related U.S. Application Data

(63) Continuation of application No. PCT/FI2015/050756, filed on Nov. 3, 2015.

(30) Foreign Application Priority Data

Nov. 3, 2015   (WO) ................. PCT/FI2015/050756

(51) Int. Cl.
*B01D 33/00*  (2006.01)
*B01D 33/056*  (2006.01)
*B01D 33/15*  (2006.01)

(52) U.S. Cl.
CPC ....... *B01D 33/0058* (2013.01); *B01D 33/056* (2013.01); *B01D 33/155* (2013.01)

(58) Field of Classification Search
CPC . B01D 33/0058; B01D 33/056; B01D 33/155
(Continued)

(56) References Cited

U.S. PATENT DOCUMENTS

| 834,233 A | 10/1906 | Evans |
| 910,075 A | 1/1909 | Lynch |

(Continued)

FOREIGN PATENT DOCUMENTS

| CL | 2018001123 A1 | 6/2018 |
| CL | 2018001125 A1 | 6/2018 |

(Continued)

OTHER PUBLICATIONS

Written Opinion of the International Searching Authority issued by the Finnish Patent and Registration Office acting as the International Searching Authority in relation to International Application No. PCT/FI2016/050768 dated Mar. 15, 2017 (10 pages).

(Continued)

*Primary Examiner* — Madeline Gonzalez
(74) *Attorney, Agent, or Firm* — Robert P. Michal, Esq.; Carter, DeLuca & Farrell LLP

(57) ABSTRACT

A vacuum belt filter including a belt with a plurality of vacuum boxes, filter means being arranged to the vacuum boxes, drive means for moving the belt, and a suction station for creating an underpressure to the vacuum boxes at the suction station. In order to enable liquid-solid separation at low energy costs and long service interval of the vacuum belt filter, the filter means is in the form of a capillary filter, each vacuum box being provided with such a filter and each vacuum box being provided with an outlet having a check valve enabling a fluid flow from the inside space of the (Continued)

vacuum box to the outside of the vacuum box for creating an underpressure in the vacuum box when the suction station is connected to the vacuum box.

14 Claims, 6 Drawing Sheets

(58) Field of Classification Search
USPC ... 210/400, 90, 97, 117, 119, 121, 123, 127, 210/136, 406, 490, 402, 404, 416.1
See application file for complete search history.

(56) References Cited

U.S. PATENT DOCUMENTS

| | | | | |
|---|---|---|---|---|
| 2,773,602 A * | 12/1956 | Sylvester | ............... | B01D 25/00 210/117 |
| 3,460,674 A | 8/1969 | Eakins | | |
| 4,265,764 A * | 5/1981 | Gallottini | ............. | B01D 33/073 210/390 |
| 2007/0227956 A1 | 10/2007 | Wietham | | |
| 2009/0325269 A1* | 12/2009 | Marschke | ............ | B01D 61/147 435/235.1 |
| 2014/0332476 A1* | 11/2014 | Pourdeyhimi | ......... | B01D 39/14 210/791 |

FOREIGN PATENT DOCUMENTS

| | | |
|---|---|---|
| CL | 2018001137 A1 | 6/2018 |
| CL | 2018001150 A1 | 7/2018 |
| CN | 2820282 Y | 9/2006 |
| CN | 1874833 A | 12/2006 |
| CN | 203082279 U | 7/2013 |
| CN | 203463731 U | 3/2014 |
| DE | 2917897 A1 | 11/1979 |
| GB | 1040080 A | 8/1966 |

OTHER PUBLICATIONS

International Search Report issued by the Finnish Patent and Registration Office acting as the International Searching Authority in relation to International Application No. PCT/FI2016/050768 dated Mar. 15, 2017 (6 pages).
International Preliminary Report on Patentability issued by the Finnish Patent and Registration Office acting as the International Preliminary Examining Authority in relation to International Application No. PCT/FI2016/050768 dated (date of completion of report) Jan. 31, 2018 (9 pages).
Extended European Search Report issued by the European Patent Office in relation to European Application No. 16861672 dated Jan. 1, 2019 (9 pages).
Supplementary Partial European Search Report issued by the European Patent Office in relation to European Application No. 16861672 dated Sep. 26, 2018 (3 pages).
Office Action issued by the Chilean Patent Office in relation to Chilean Patent Application No. 201801120 dated Jul. 10, 2019 (6 pages).
Office Action issued by the Eurasian Patent Office in relation to Eurasian Patent Application No. 201890962/31 dated Aug. 2, 2019 (2 pages) along with English language translation (2 pages).
Chinese Office Action dated Dec. 2, 2019, issued in CN Appln. No. 201680069302.1 (10 pages) along with English translation (9 pages).

* cited by examiner

VACUUM BOX, BELT FILTER, METHODS FOR SERVICING A VACUUM BELT FILTER, METHOD FOR LIQUID-SOLID SEPARATION OF A SLURRY, AND FILTER ELEMENT

CROSS-REFERENCE TO RELATED APPLICATIONS

This application is a National Phase Entry under 35 U.S.C. § 371 of PCT International Application No. PCT/FI2016/050768 filed Nov. 2, 2016, which claims the benefit of PCT International Patent Application No. PCT/FI2015/050756 filed Nov. 3, 2015, the disclosure of each of these applications are expressly incorporated herein by reference in their entirety.

BACKGROUND OF THE INVENTION

Filtration is a widely used process in which a solid-liquid mixture, such as a slurry or sludge, is forced against a filtering media, with the solids retaining on the filtering media and the liquid phase passing through. The present invention relates more precisely to a vacuum box and a vacuum belt filter. Vacuum belt filters are conveyor-type filters widely used in the dewatering of slurries. The invention relates further to servicing a vacuum belt filter and to a method for liquid-solid separation of slurry in a belt filter. The invention relates further to a filter element. With vacuum is here understood a pressure below a surrounding pressure which typically, but not necessarily, is the atmospheric pressure of 1 bar.

BRIEF DESCRIPTION OF THE INVENTION

It is an object of the present invention to provide a new type of vacuum belt filter and a new method for liquid-solid separation, said belt filter having a simple construction enabling liquid-solid separation with low energy consumption and having long service interval. It is further an object of the present invention to provide a filter element and a vacuum box for building the vacuum belt filter of the invention, and a method for servicing the vacuum belt filter of the invention, the vacuum box being capable of maintaining an underpressure within its inside space without being connected to a vacuum source. With the expression vacuum source is here meant a source capable of creating into the vacuum boxes a pressure which is below the surrounding pressure, typically below the atmospheric pressure of 1 bar.

In order to achieve these objects, the belt filter, the vacuum box, and the filter element have a construction as defined in the appended, respective independents claims, and the method for servicing and carrying out liquid-solid separation are characterized by the features defined in the respective independent method claims. Preferred embodiments of the vacuum belt filter, the vacuum box, the filter element and the method for liquid-solid separation of a slurry are disclosed in the appended, respective dependent claims.

A capillary filter refers to a filter the structure and/or the material of which enables a certain amount of liquid, such as water, to be retained in the filter by a capillary action despite a differential pressure formed by a gas surrounding the filter. The liquid may be retained in the micro-pores provided in the filter. A capillary filter enables the liquid to be filtered to easily flow through the filter, but when all free liquid, such as the free liquid entering the filter has passed through the filter, the remaining liquid retained in the filter by the capillary action prevents flow of gas, such as air, through the wet filter.

A major advantage of the vacuum belt filter, the vacuum box and the filter element of the invention is that they enable liquid-solid separation at low energy costs and the servicing interval of the belt filter is long, because the life-time of the filters of the belt filter is long. The vacuum box of the vacuum belt filter has a simple construction making it, and also the belt filter, easy to build. The belt filter can be operated with an extremely small vacuum pump this meaning essential energy savings. Despite this, a high underpressure, i.e. a low absolute pressure, can be created within the vacuum box. Service and repair of the belt filter is easy. The vacuum boxes can be replaced individually without a need to replace all the vacuum boxes if one or more of the vacuum boxes is a need of repair. Filtration can continue within the vacuum boxes without continuous vacuum feed. Moreover, the vacuum belt filter according to invention is suitable for long cake drying periods because the length of the belt can be selected freely. In the vacuum belt filter according to invention a total filter media is divided into a large number of vacuum boxes each working as an individual dewatering element. In the vacuum belt filter according to invention the differential pressure responsible for the dewatering is effective over the whole length of the belt from vacuum station to discharge station. This is the most efficient way of achieving lowest cake moisture. In the vacuum belt filter according to invention leakage of air between the filter media and the vacuum box does not appear and a differential pressure over the filter cake is maintained. Hence, as the vacuum source does not have to compensate for leakage, the dewatering of the filter cake is efficient and energy consumption is low.

BRIEF DESCRIPTION OF THE DRAWINGS

The invention is described in closer detail with reference to the accompanying drawing in which.

DETAILED DESCRIPTION OF THE INVENTION

Figure 1:
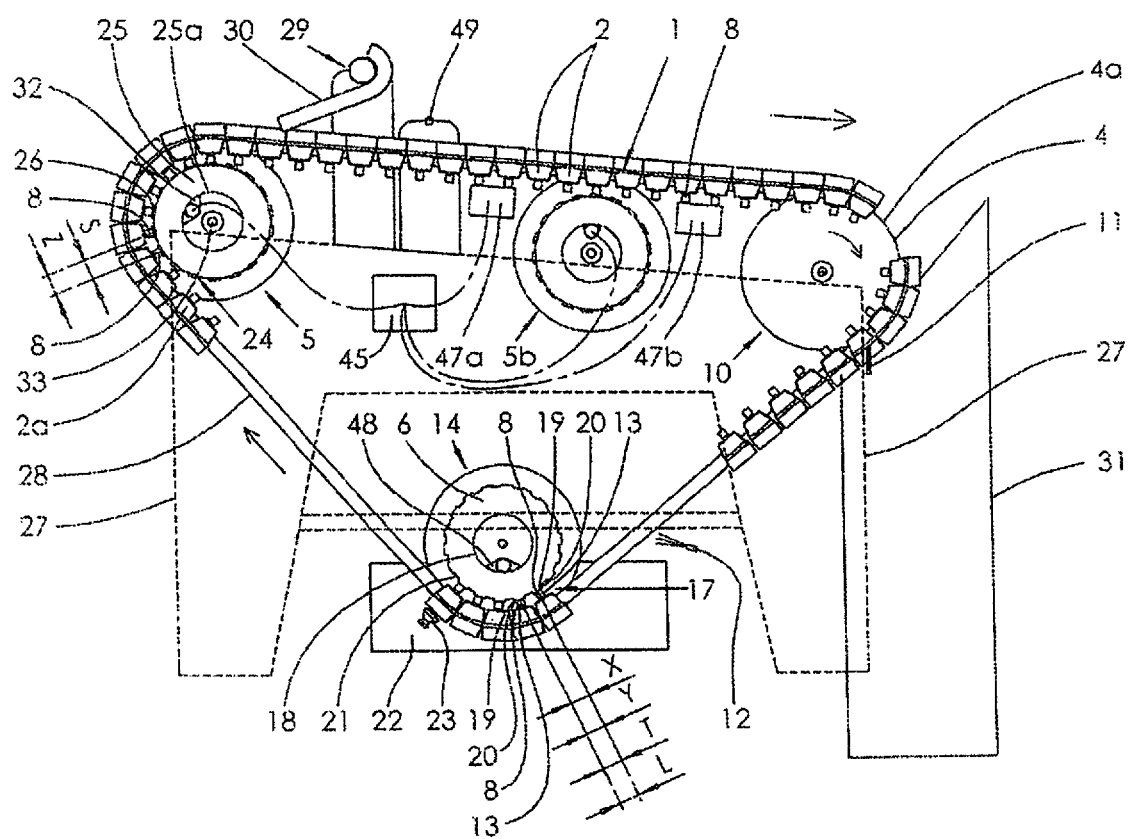
FIG. 1 illustrates in a side view of a vacuum belt filter according to the invention.

FIG. 1 illustrates in a side view, one embodiment of the vacuum belt filter according to the invention. The vacuum belt filter shown in the drawings is constructed for continuous liquid-solid separation of slurry or similar feed. The vacuum belt filter comprises an endless belt 1 comprising a multitude of individual vacuum boxes 2 arranged one after another in the longitudinal direction of the belt. The vacuum boxes 2 each comprise a filter means in the form of a capillary filter the filter means preferably being formed of the capillary filter (see filter 7 in FIG. 3). In a capillary filter, water (liquid) is kept in the micro-pores of the filter medium by the capillary forces and no flow of air takes place after the free water in the residue (e.g. filter cake) has been removed. The capillary action of the filter does not participate in the dewatering itself, for instance by sucking water out of the slurry. The capillary filter is preferably planar and stiff. With a stiff filter is here meant a rigid filter element which does not collapse inside the vacuum box 2 under the prevailing vacuum conditions, minor deformation being acceptable. Reference numeral 29 illustrates a feed station for feeding slurry on the belt 1 of the belt filter. Reference numeral 30 shows an inclined chute of the feed station 29 for feeding the slurry on the upper surface of the vacuum boxes 2 and more precisely on the filters thereof. The slurry can for example be coarse iron concentrate or organic slurry consisting of fine particles such as organic biomass.

The vacuum boxes 2 follow one after another along the whole length of the belt 1, but for sake of simplicity, all vacuum boxes have not been illustrated. The number of vacuum boxes is dozens and more typically hundreds. No gap is present between adjacent vacuum boxes 2 at the feed station 29. This can e.g. be achieved by arranging a seal (not shown) between the vacuum boxes 2. Such a seal is positioned along one long side of the vacuum box 2. Further, for the sake of simplicity, lateral shields preventing slurry from falling out laterally from the belt 1 are not shown in FIG. 1. These lateral shields, which are mounted on end walls of the vacuum box 2, are, however, seen in FIG. 3, c.f. shields 42, 43. The vacuum boxes 2 are arranged on a drive chain 28 of the belt 1 and supported by the drive chain so that they move at synchronized velocity with the drive chain. The drive chain 28 replaces the expensive and massive rubber belts known from prior art vacuum belt filters and owing to this, the costs for manufacturing the vacuum belt filter of the present invention are lower. Replacing a rubber belt with a drive chain also lowers the weight of the moving masses of the vacuum belt filter, and as a consequence, less energy is needed for moving the belt and operating the vacuum belt filter.

Figure 15:
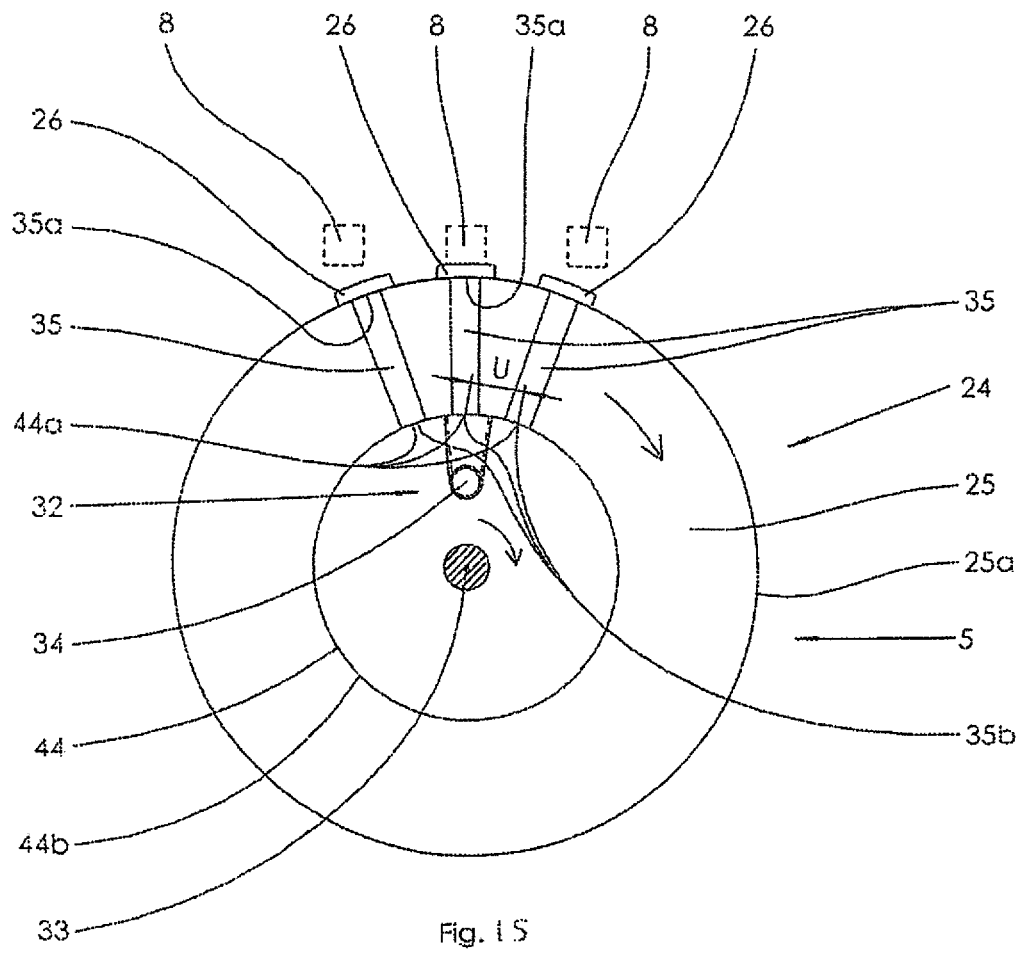
FIG. 15 illustrates a suction station in an inlet of the vacuum belt filter of FIG. 1.
Figure 16:
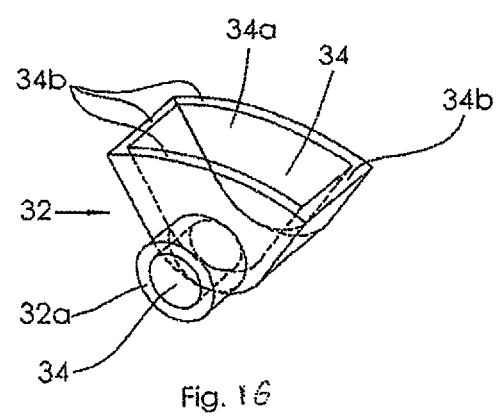
FIG. 16 shows a stationary distribution part of the suction arrangement.

Reference numeral 5 shows a suction station for applying suction to the vacuum boxes 2. The suction station 5 comprises a rotating distribution valve suction arrangement 24 which for sake of simplicity in the following is also called rotating suction arrangement. FIG. 15 shows in more detail the rotating suction arrangement 24. The rotating suction arrangement 24 comprises a rotating (rotatable) member 25 provided with a plurality of suction ends 26 arranged at a periphery 25a of the rotating member 25. The rotating member 25 is preferably circular having a circular periphery 25a, but can more generally be circumferential, i.e. it need not be fully circular having a constant radius. However, a rotating member 25 which is circular enables an easy achievable track for the belt 1 and an easy design of the supports for the belt. The rotating member 25 has such suction ends 26 along its entire periphery (360 degrees), but for sake of simplicity only a few suction ends 26 have been drawn in the figure. The suction ends 26 are arranged at a distance Z from each other which corresponds to the distance S between outlets 8 of adjacent vacuum boxes 2, c.f. FIG. 1. The suction ends 26 are adapted to be connected to the outlets 8 of the vacuum boxes 2 in order to apply suction to the vacuum boxes 2. The rotating suction arrangement 24 creates a fluid communication between a vacuum source 45 and the outlet 8 only when the suction ends 26 are connected to the outlet 8 of the vacuum boxes 2. The vacuum source 45 comprises a pump (not specifically shown) for creating an underpressure. The effect of the pump can be surprisingly low; an effect of 1 to 5 kW is sufficient for filtering means having a total filtering area of approximately 20 m$^2$ to 100 m$^2$. A non-rotatable stationary distribution part 32 is via a connection part 32a (see FIG. 12) thereof connected to the vacuum source (see reference sign 45 in FIG. 1) and opens against an inner rim 44b of the rotating member 25 via a suction port 34. Preferably the inner rim 44b is circular. As can be seen from FIGS. 15 and 16, the suction port 34 of the distribution part 32 comprises a suction opening 34a which faces only a part of a multitude of openings 44a provided in the inner rim 44b of the rotating member 25. Said inner rim 44b forms a distribution surface 44 comprising said multitude of openings 44a. Adjacent openings 44a are arranged at a constant distance U from one another. The rotating member 25 is provided with conduits 35 so that each suction end 26 has its own conduit 35 leading to the suction port 34. Each conduit 35 comprises a first end 35a being in fluid communication with a suction end 26, and an opposite second end 35b being in fluid communication with the opening 44a of the inner rim 44b of the rotating member 25. The opening 44a of the distribution surface 44 comes into fluid communication with the suction opening 34a of the suction port 34 only at intervals when the rotating member 25 and the distribution surface 44 thereof are rotating. In order to provide effective fluid communication and effective suction the shape and curvature of the suction opening 34a correspond to the shape and curvature of the inner rim 44b of the rotating member 25.

Figure 14:
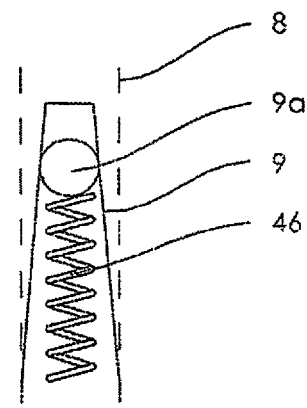
FIG. 14 illustrates a check valve in an outlet of the vacuum box of FIG. 3.

The suction opening 34a may be bordered with seals 34b so that the suction opening 34a lies tightly and sealingly against the distribution surface 44 of the rotating member 25. In FIG. 15 only the suction end 26 in the middle of the three suction ends 26 shown in FIG. 14 is connected to the outlet 8 of a vacuum box, and only this suction end 26 applies via i) the suction port 34, ii) the conduit 35 and iii) the suction end 26 a suction to said outlet 8 (i.e. the middle outlet 8 of the shown three outlets 8 in FIG. 10). The conduits 35 are preferably formed of radial channels made in the rotating member 25.

Reference numeral 33 shows a shaft arranged centrally with respect to the rotating member 25. The shaft 33 is supported on bearings (not shown). When the shaft 33 rotates, also the rotating member 25 rotates and each of the suction ends 26 comes in turn in connection with outlets 8 of the vacuum boxes. Alternatively the shaft can be non-rotatable, whereby the member 25 is arranged to rotate relative to the shaft. A rotatable shaft is preferred over a non-rotatable shaft, because bearings mounted at the ends of the shaft are easy to replace (when needed); a shaft fixed to the rotating member 25 is also easy to lathe.

In FIG. 1 reference numeral 4 indicates a drive means for driving the belt 1 by driving the drive chain 28 thereof. The drive means 4 comprises a turn pulley 4a which has been bearing-mounted on a frame 27 of the vacuum belt filter. The frame 27 has been draft with broken line. The drive means 4 further comprises a moving apparatus (not shown) for driving the turn pulley 4a of the drive means 4. The moving apparatus is preferably electrically driven (an electric motor), because an electric motor enables precise adjustment of speed of the belt 1, which, in turn, improves adjustability of the process. Alternatively, the belt 1 can be hydraulically, pneumatically, wind-, water- or biologically powered. A hydraulic motor provides rather precise adjustment of speed of the belt. The drive means 4 rotates the belt 1 with a speed of typically 0.1 m/s to 0.5 m/s.

Figure 3:
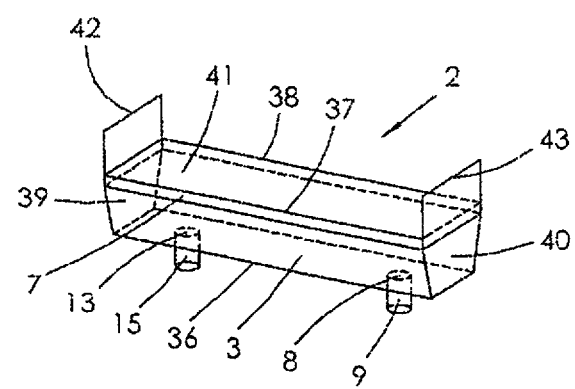
FIG. 3 illustrates a vacuum box of the vacuum belt filter of FIG. 1, FIGS. 4*a*, 4 and 5 show in more detail a vacuum box and a first embodiment of the filter element of the vacuum box of FIG. 3.

Reference numeral 10 in FIG. 1 shows a discharge station for removing residue in the form of a filter cake from a filter media or filter 7 of the vacuum boxes 2 (the filter being indicated by reference numeral 7 in FIG. 3). When the vacuum boxes 2 move from the feed station 29 to the discharge station 10, a filter cake is gradually built up on the upper surface of the filter 7 on the upper side of the vacuum box when water is removed from the slurry. The vacuum inside the vacuum box 2 will affect the filter cake and causes dewatering during the whole way from the suction station 5 to discharge station 10.

Reference numeral 49 indicates a filter cake washing apparatus for washing the filter cake. The washing apparatus is designed to deliver clean water or other washing fluid on the filter cake. The design of the cake washing apparatus is not explained in more detail here, because a filter cake washing apparatus is known for a person skilled in the art. The washing fluid penetrates the filter cake and travels to the capillary filter where it is absorbed to the capillary filter. When the washing fluid travels through the filter cake, desired substances, such as alkalis and salts are mixed with the washing fluid in this way cleaning the filter cake from unwanted impurities. Sometimes the filtrate absorbed to the capillary filter is a desired end product and the filter cake is waste. In such a case, valuable substances are collected from the filter cake by washing the filter cake.

The distance between the feed station 29 and the discharge station 10 is typically 5 m to 50 m, preferably 10 m to 30 m. The discharge station 10 comprises one or more scrapers 11 for removing the residue from a dirty side (the upper side) of the filter 7. Reference numeral 31 shows a discharge container for collecting the residue (the filter cakes). The container 31 is positioned under the scraper(s) 11. Instead of scrapers 11 other type of removal tools, such as pressurized air, can be used for removing the residue from the filters. In the case of a heavy filter cake with low adhesion to the filter media the cake discharge may take place by the gravity force upon turning around the vacuum box at the discharge station.

Reference numeral 14 shows a backwash station for cleaning the vacuum boxes 2 and especially the filters 7 thereof after the filter cakes have been removed. Backwash of the filters is needed to maintain the permeability of the filter medium and the filtration capacity. The backwash station 14 is associated with a wash vat 22 into which the vacuum boxes 2 are fed.

FIG. 3 shows a vacuum box 2 in more detail. The vacuum box 2 comprises a bottom 36, two opposite long sides 37, 38, two opposite short sides 39, 40, or end walls, and a top 41. The end walls 39, 40 are inclined so that the vacuum box 2 tapers in a direction towards its bottom 36. Such a tapering design is advantageous for the turning of the vacuum box 2 at the bends of the endless belt 1, i.e. over the turn pulley 4a of the drive means 4, and at the suction station 5, and at the backwash station 14. The tapering design provides an easy solution for enables to arrange adjacent vacuum boxes 2 and especially the filters 7 thereof close to one another at the straight portion of the belt 1 between the suction station 5 and the drive means 4 which is at the discharge station 10. A tapering design is, however, not mandatory. The vacuum box 2 comprises an inside space 3 for receiving filtrate originating from the slurry. The residue (the filter cake) will collect on the upper surface of the vacuum boxes 2, on the capillary filter 7 thereof. The capillary filter media will prevent air from entering the inside space 3 of the vacuum boxes 2. The stiff nature of the filter media will support the filter cake and makes it possible to form a cake of a very even thickness onto the filter medium. The capillary filter 7 is preferably a micro porous ceramic filter preferably in the form of a stiff plate. A ceramic filter is stiff and has a good endurance against corrosion; it is also durable and strong. Alternatively, the filter can be a micro porous metallic or plastic filter [or other material providing capillary action and resistance against corrosion which are required in the belt filter]. The filter need not, however, be stiff; it can be alternatively a flexible cloth, fabric or film supported from below. If the filter is flexible (a flexible cloth), it must be supported from above if backwash of the filter is carried out. A supported flexible filter material can be designed in a filter cartridge, which can be attached onto a frame to form a vacuum box. The effective filtering area of the capillary filter 7 is preferably 1 to 5 $m^2$, e.g. 1 $m^2$, and the volume of the vacuum box 2 is 10 l to 500 l, preferably 50 l to 200 l. The dimensions and volume of the vacuum box 2 can vary depending on application. The pore size of the filter 7 is 0.03 µm to 5 µm, preferably 0.04 µm to 3 µm, and even more preferably 0.05 µm to 2 µm calculated from the bubble point of the material for pure water. The bubble point refers to an effective bubble point. The effective bubble point describes a pressure difference between the upper surface of the capillary filter 7 (c.f. the top 41 of the vacuum box 2) and the inside surface of the capillary filter (i.e. the clean side of the capillary filter facing the inside space 3 of the vacuum box 2) at which 1 liter of air flows through one square meter of the filter surfaces during a one minute time. In other words, if the (effective) bubble point of the capillary filter 7 is 0.9, when a 0.9 bar pressure difference is provided in such a capillary filter 7 between the outside surface of the filter and the inside surface of the capillary filter, 1 liter of air passes through a square meter of the filter surfaces during one minute. If the bubble point is 0.9 bar and the total area of the filter surfaces is 2 square meters, 2 l of water passes through the filter surfaces in one minute. The bubble-point of the capillary filter 7 is high; preferably 0.5 bar to 1.5 bar, and more preferably 0.8 bar to 1 bar. If filtering is carried out with a pressure difference which is below the bubble point, air does not penetrate the filter cake or the filter, and there is no pressure loss owing to air flow. If the bubble point is low, e.g. much below 0.5 bar, the vacuum box does not function well unless the material to be filtered is highly compressible, such as organic mass (e.g. chemical pulp). If the bubble point is above 1 bar, e.g. 1.5 bar or even 3 bar, the filtering works, but the pore size is small and the flow resistance is big if the thickness of the filter material is not adjusted to be proportionally smaller.

Figure 4:
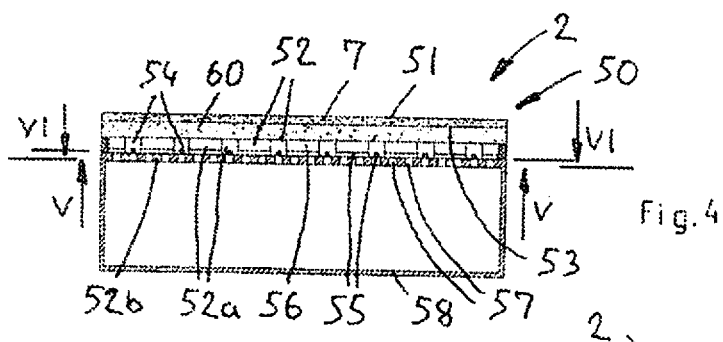
Figure 4A:
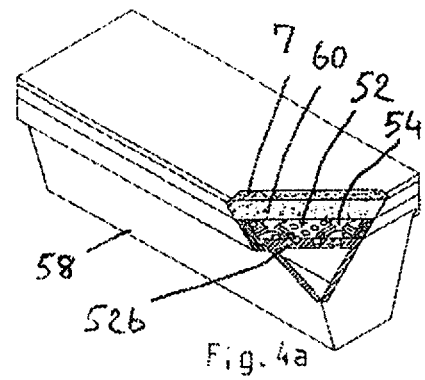

The capillary filter 7 is part of a replaceable filter element 50, which is described in more detail with reference to FIG. 4a and FIGS. 4 to 6. FIGS. 4a and 4 show a vacuum box 2 with the filter element 50. The replaceable filter element 50 is a spare part of the vacuum belt filter. The replaceable filter element 50 shown in FIGS. 4a, 4 and 5 comprises a preferably planar capillary filter 7 comprising a first permeable filter surface 51 for receiving a feed, a second surface 53 of the capillary filter being opposite to the first filter surface, and a support structure 52 for supporting the second surface of the capillary filter. The capillary filter 7 is preferably rectangular. The width of the capillary filter 7 is 0.1 m to 0.3 m; and the length of the capillary filter is 1.5 m to 3 m, the length being 5 to 10 times the width of the capillary filter. Said length dimension is transverse to the direction to the direction of motion of the belt 1. The thickness of the capillary filter 7 is preferably 0.1 mm to 10 mm. If the support structure is of plastic material, the thickness of the capillary filter 7 is preferably 0.2 mm to 10 mm. The support structure 52 is designed to provide an even support for the capillary filter 7. Without a support structure 52 the risk of break of the capillary filter 7 is big, especially if the capillary filter is made of ceramic material. The support structure 52 is preferably via an intermediate layer 60 permanently attached to the second surface 53 of the capillary filter 7 and it is designed to support the capillary filter in such a way that the capillary filter does not break in use, i.e. when a pressure difference acts over the first filter surface 51 and the second surface 53 causing huge forces on the capillary filter 7. The intermediate layer 60 is highly preferred, because it makes it easy to attach the support structure 52 to the capillary filter 7. A first surface of the intermediate layer 60 faces the second surface 53 of the capillary filter 7, and a second surface of the intermediate layer being opposite to the first surface faces the support structure 52. The intermediate layer 60 is preferably ceramic.

Figure 5:
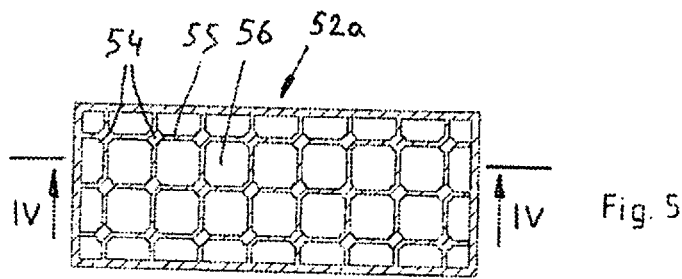

The support 52 structure for the capillary filter 7 is preferably in the form of a planar support element also called a first support element 52a in the following. The support structure 52 defines a cavity 56, a plurality of support parts 54 for supporting the second surface of the capillary filter being arranged in the cavity. The support parts 54 may preferably be shaped as studs. The number of support parts 54 is 50 to 4000 per square meter. If the support parts 54 have a round cross section (in a plane parallel to the plane of the planar support structure 52), the number of support parts is preferably 1000 to 4000 per square meter, more preferably 1500 to 2500 per square meter. If the support parts 54 have an elongated cross section, the number of support parts is preferably 50 to 400 per square meter, more preferably 100 to 200 per square meter. The support parts 54 are spaced from one another in order to provide an even support for the capillary ceramic filter 7. Preferably the support parts 54 are evenly distributed below the second surface 53 of the capillary ceramic filter 7. The support structure 52 may be designed to prevent transfer of forces between the support parts 54. Preferably the support structure 52 comprises connectors 55 for connecting each support part 54 to at least one other support part, c.f. FIG. 5. By providing flexible connectors 55, the support parts 54 do not transfer forces to one another, and possible problems related to thermal expansion between the different components of the filter element 50 can be avoided. The support structure 52 preferably forms a grid structure as one can see from FIG. 5. The thickness of the support structure 52 depends on many parameters, such as the surface area of the capillary filter 7. A suitable thickness is believed to be 50 mm to 200 mm.

The support parts 54 facing the second surface 53 of the capillary filter 7 form a plurality of support surfaces against the second surface of the intermediate layer 60 and indirectly against the capillary filter 7, which support surfaces amount to 5 percent to 60 percent, preferably 10 percent to 40 percent, and more preferably 15 percent to 25 percent of a total area of the second surface of the capillary filter.

The intermediate layer 60 is preferably a ceramic layer. The second surface of the intermediate layer 60 comprises a rough joining interface for fastening the support structure 52 permanently to the intermediate layer 60. The rough joining interface has a grit number of 40 to 300, preferably 40 to 180, and more preferably 60 to 120. Such a grit range functions especially well for fastening support parts 54 made of e.g. thermoplastic material permanently to the second surface of the intermediate layer 60 by e.g. gluing, or by melting the ends of the support parts 54 into the second surface. When the ends of the support parts 54 are melted into the second surface of the intermediate layer 60, there is a layer comprising the material or the support structure which attaches the support structure to the rough joining interface of the intermediate layer 60. In such a construction, the support structure 32 is formed as a unit with the capillary filter 7 and one may say that the support structure is an integral part of the intermediate layer 60 and the capillary filter 7. One may, however, contemplate that the rough joining interface is formed directly, i.e. without an intermediate layer 60, to the second surface 53 of the capillary filter 7. The whole second surface of the intermediate layer 60 need not be roughened; it is sufficient if the second surface is, or has been roughened at points where the support parts 54 are fastened. These points form a rough joining interface. When made of preferably a ceramic material, the thickness of the intermediate layer 60 is preferably 5 mm to 40 mm, more preferably 5 mm to 20 mm.

The strength of the connection between a support parts 54 and the second surface 53 must be sufficient for the filter element 50 to endure pressures acting on the filter element 50 especially during back washing (when the vacuum boxes are cleaned) but also during filtration. During back washing, the connection must be strong enough to endure a pressure difference of at least 0.4 bar, preferably at least 0.7 bar, During back washing, if the pressure outside the vacuum box 2 is 1 bar and the pressure inside the vacuum box is 1.4 bar, the pressure difference is 0.4 bar; and if the pressure outside the vacuum box 2 is 1 bar and the pressure inside the vacuum box is 1.7 bar, the pressure difference is 0.7 bar. During filtration, the support structure 52 must be strong enough to endure a pressure difference of at least 0.4 bar, preferably at least 0.5 bar, and more preferably at least 0.6 bar over the filter element 7. During filtration, if the pressure outside the vacuum box 2 is 1 bar and the pressure inside the vacuum box is 0.4 bar, the pressure difference is 0.6 bar, and if the pressure outside the vacuum box 2 is 1 bar and the pressure inside the vacuum box is 0.8 bar, the pressure difference is 0.2 bar.

Figure 6:
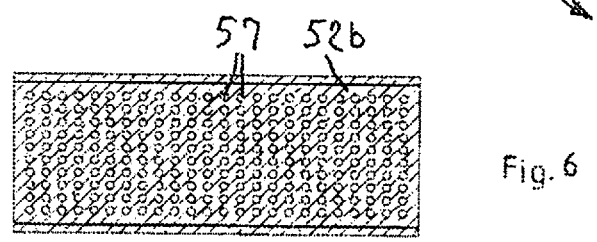
FIG. 6 shows a support element for supporting the filter element of FIGS. 4 and 5 in the vacuum box of FIG. 3, FIGS. 7*a*, 7 and 8 show in more detail a vacuum box and a second embodiment of the filter element of the vacuum box of FIG. 3 in a side view and in a sectional view taken along section VIII-VIII of FIG. 7, respectively.

Reference numeral 52b in FIGS. 4a, 4 and 6 is drawn to a second support element which is fixed to the body part 58 of the vacuum box 2. The support element 52b is preferably a planar element which is attached preferably on top of the body part 58 of the vacuum box 2. The support element 52b can be an integral part of the body part 58. The support element 52b is not part of the filter element 50 (i.e. is not part of the spare part). The periphery of the support element 52b can be arranged to be supported on brackets provided inside the body part 58. The support element 52b can be attached to the body part 58 of the vacuum box e.g. by clips (not shown) or other fastening means. Preferably, the support element 52b is alternatively or additionally attached to the bottom of the body part 58, e.g. by bolts or other detachable fastening means. Fastening of the support element 52b to the body part 58 is not disclosed here in more detail, because a person skilled in the art readily can find out various suitable designs for such attachment. The support element 52b comprises a multitude of holes 57 which enable filtrate to pass into the inside space of the vacuum box 2.

Figure 7:
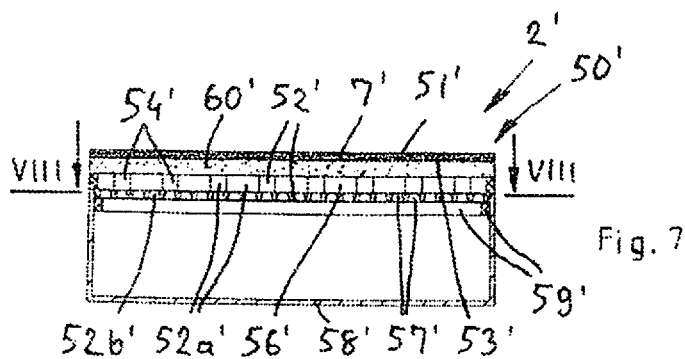
Figure 8:
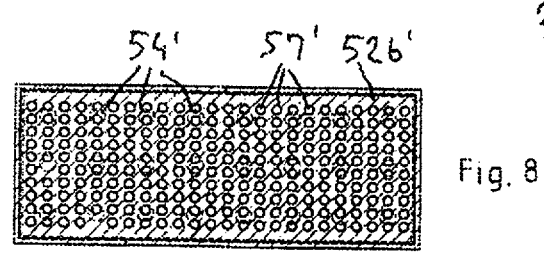
Figure 7A:
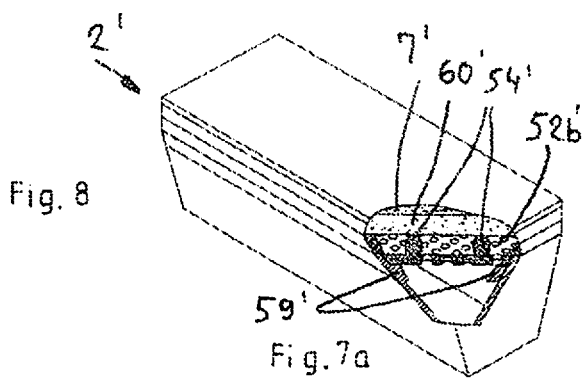

FIGS. 7a, 7 and 8 illustrate a second embodiment of the filter element. In FIGS. 7a, 7 and 8 have been used similar reference numerals as in FIGS. 4 to 6 for corresponding components. The filter element 50' of FIGS. 7a, 7 and 8 differs from the embodiment shown in FIG. 4a and FIGS. 4-6 in that the support element 52a' is fastened not only to the intermediate layer 60, but also to the support element 52b', which thus is part of the support structure 52' and part of filter element 50'. Connectors, c.f. connectors 55 like those in FIG. 5, are not needed, because support element 52b' connects the support parts 54'. Support element 52b' is thus also a connecting means. The fastening of the support element 52a' to the support element 52b' can be carried out by various manners (permanently e.g. by gluing, or detachably e.g. by snap fasteners) as appreciated by a person skilled in the art. The support element 52b' of FIG. 8 comprises a multitude of holes 57', like support element 52b of FIG. 6. The support element 52b' provides additional stiffness to the support structure 52' and the filter 7' which is advantageous especially during back washing of the filter. Added stiffness is advantageous and important, because it reduces risk of the capillary filter 7' to break during back washing. The filter element 50' of FIGS. 7a, 7 and 8 is also advantageous in that it is a compact structure which can be factory built and easily mounted on site. The periphery of filter element 50' is arranged to be supported on brackets 59' provided inside the body part 58 of a vacuum box.

Figure 10:
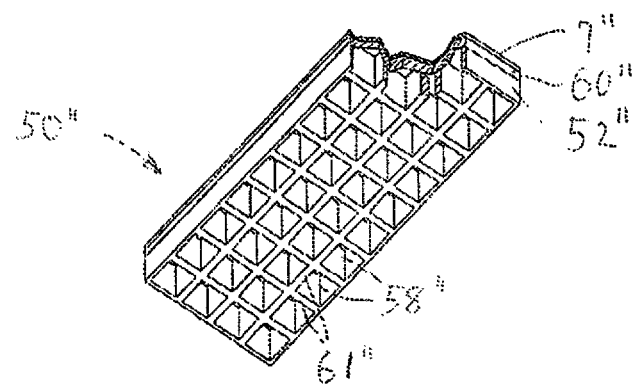
FIGS. 9 and 10 show a third embodiment of the filter element of the vacuum box in two different perspective views.
Figure 9:
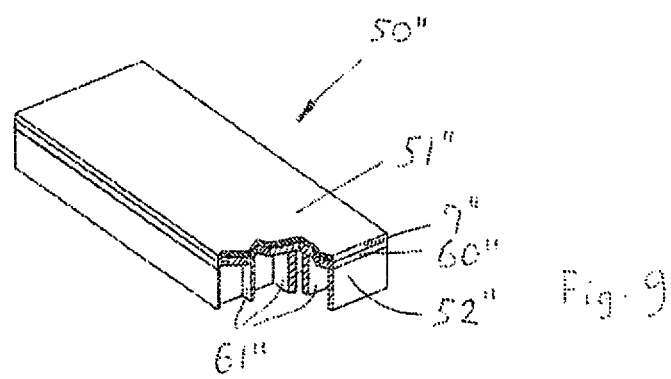

FIGS. 9 and 10 show a third embodiment of the filter element 50". A corner area of the filter element 50" is shown opened in the figures—only to illustrate the construction of the filter element. In the embodiment of FIGS. 9 and 10 the capillary filter 7" is supported by a support structure 52" in the form of a honeycomb structure. The honeycomb structure comprises a multitude of spaced holes 58" defined by walls 61". The honeycomb structure can preferably be made of plastic, preferably thermoplastic. If the honeycomb structure is made of plastic, there is preferably an intermediate ceramic layer 60" between the filter 7" and the honeycomb structure as shown in FIGS. 9 and 10. The intermediate ceramic layer 60" has a grit number of 40 to 300, preferably 40 to 180, more preferably 60-120 which grid values form a rough joining interface for attaching of the honeycomb structure to the capillary filter 7". However, the honeycomb structure can alternatively be made of e.g. ceramic material. If the support structure 52" is made of ceramic material and the capillary filter 7" is of ceramic material, no intermediate layer 60" is needed. The thickness of the honeycomb structure is 5 mm to 200 mm, preferably 10 mm to 150 mm.

Figure 12:
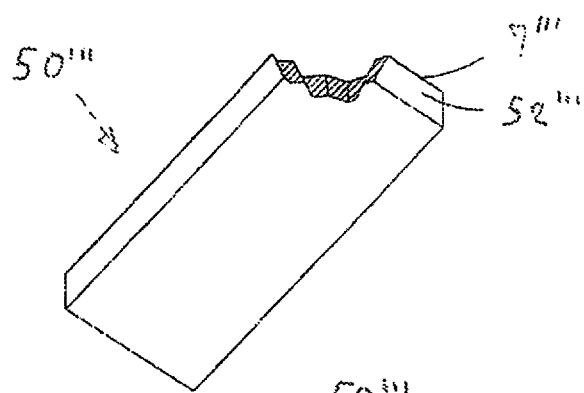
FIGS. 11 and 12 show a fourth embodiment of the filter element of the vacuum box in two different perspective views.
Figure 11:
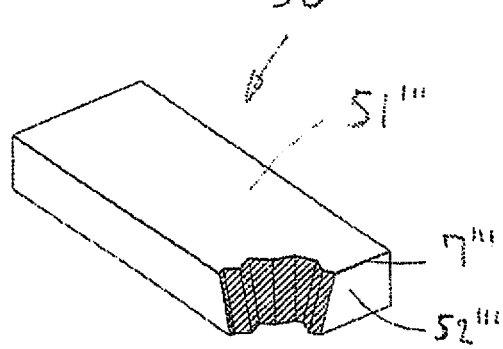

FIGS. 11 and 12 show a fourth embodiment of the filter element. The filter element 50''' of FIGS. 11 and 12 differs from the filter element 50''' of FIGS. 9 and 10 essentially in that the support structure 52" is a compact piece of porous material, i.e. it does not comprise (macroscopic) holes, c.f. holes 58" in FIG. 10. A corner of the filter element 50''' is shown opened to illustrate this. The pore size of the compact piece is bigger than the pore size of the ceramic filter 7'''. The piece is preferably a ceramic brick preferably made of a highly porous material. Alternatively, a compact piece of plastic or a piece of porous metal can be used. The capillary filter 7''' has been formed onto the brick preferably by spraying. The manufacturing of the filter element 50''' comprises preferably compressing a raw material to a brick, burning the brick in an oven, spraying the brick with a ceramic membrane layer, and finally burning the brick with the membrane layer in an oven. The brick has a grit number of 40 to 300, preferably 40 to 180, more preferably 60 to 120. If the brick is manufactured of a material having an average grit number e.g. 100, one hundred particles arranged in a row fill up a distance of one inch. Alternatively, the brick could be glued to the capillary filter 7'''. If glued, the filter surface facing the brick should be rough, preferably having a grit number of 40 to 180, and more preferably 60 to 120, in order to achieve a strong bond. The thickness of the brick is preferably 10 mm to 100 mm. The thickness of the capillary filter 7''' is preferably 0.1 mm to 10 mm, preferably 0.1 mm to 7 mm.

Thanks to the design of the vacuum box 2, the vacuum boxes and the filters 7 thereof can easily be individually replaced in contrast to a conventional vacuum belt filter employing a filter cloth as filtering media. Thus there is no need to replace a whole worn filter cloth (worn e.g. owing to stretching) the length of which typically is dozens of meters, the replacement being cumbersome and time consuming.

The outlet 8 of the vacuum box 2 has a check valve 9 which enables fluid to be withdrawn from the inside space 3 of the vacuum box out from the vacuum box via the outlet. The check valve 9 is illustrated in FIG. 14 in more detail. The check valve 9 comprises a spring 46 which urges a blocking member 9a of the check valve 9 against a seat. The spring 46 is a helical spring, but other types of springs can be employed. When the spring 46 is in its maximally extended position, the check valve 9 is closed, and no fluid (liquid, gas or other substance) may enter from the inside space 3 of the vacuum box 2 to the outside of the vacuum box through the outlet 8. When the pressure from the inside space 3 of the vacuum box 2 exceeds the pressure created by the spring 46 against the blocking member 9a, the check valve 9 is open. Instead of a helical spring, a rubber spring can be used; or cup springs. One may also consider using a gas spring. Instead of a spring loaded check valve having a separate spring which activates the movement of a blocking member, other types of check valves can be used. The check valve can function based on the design of e.g. a membrane, clack, a poppet, a goose neck, whereby the valve itself functions like a spring. More generally defined, the check valve 9 comprises a mechanical actuator for closing a blocking member. The check valve can e.g. be a solenoid valve (which may be energized from outside), a mechanically controlled valve, a pneumatically controlled valve and/or a hydraulically controlled valve. Although recommendable, the spring 46 or other mechanical actuator is not indispensable, because the blocking member 9a can owing to underpressure within the inside space 3 of the vacuum box 2 be kept in a blocking position. The basic structure of the check valve may be based on e.g. a membrane, a clack, a poppet, a goose neck, a ball, a slide, a flex hose, a needle or any other type of valve known per se.

Figure 13:
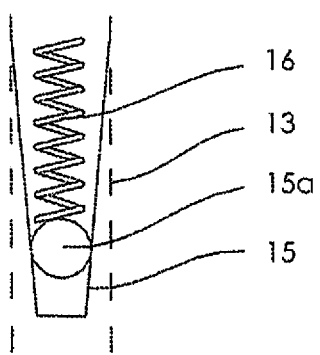
FIG. 13 illustrates a check valve of the vacuum box of FIG. 3.

Reference numeral 13 indicates an inlet of the vacuum box 2. FIG. 13 shows a spring loaded check valve 15 in the inlet 13. A spring 16 of the check valve 15 urges a blocking member 15a of the check valve 15 against a seat. The spring 16 is a helical spring, but other types of springs can be employed as explained above for spring 46. When the spring 16 is in its extended position, the check valve 15 is closed, and no fluid (liquid, gas or other substance) may enter to the inside space 3 of the vacuum box 2. By applying on the blocking member 15a an external force which is opposite to the force of the spring 16, the blocking member 15a can be displaced in a direction towards the spring 16 (i.e. upwards in FIG. 13), whereby the spring flexes and the check valve 15 opens. In order that the check valve 15 opens, the pressure acting from the outside of the vacuum box 2 on the blocking member 15a must be bigger than the force of the spring and the pressure acting from the inside of the vacuum box on the blocking member. As for check valve 9, instead of a spring loaded check valve 15 having a separate spring which activates the movement of a closing member, other types of check valves can be used. More generally defined, the check valve 15 comprises a mechanical actuator for closing a blocking member.

In the following the working and the construction of the belt filter will be described in more detail with reference to the figures.

Before the vacuum boxes 2 enter the suction station 5 they have been cleaned in the backwash station 14 located upstream from the suction station 5, see FIG. 1. When entering the suction station 5, the inside space (see reference numeral 3 in FIG. 3) of the vacuum boxes 2 have the same pressure as the surrounding atmosphere, i.e. 1 atmosphere (1 bar). However, the inside space can have a pressure deviating from the pressure of the surrounding atmosphere.

When the vacuum box 2 enters the suction station 5, its outlet 8 becomes automatically connected to the suction end 26 of the rotating member 25. The automatic connection is formed when the outlet 8 of the vacuum box 2 enters a suction end 26 of the rotating member 25. As the design of such a connection is easily understood by a person skilled in the art, it is not explained in more detail here. The suction end 26 becomes connected to the vacuum source 45 via the conduit 35 and the distribution part 32. In FIG. 1 vacuum box 2a illustrates a vacuum box entering the suction station 5. When suction is applied to the outlet 8 of the vacuum box 2a, the inlet 13 of the vacuum box 2a will not open but is kept closed owing to the spring 16 of the spring loaded check valve 15, c.f. FIGS. 3 and 13. The spring force of the spring 16 must be bigger than the force of the suction in order to keep the inlet 13 closed during suction and in order to create and maintain an underpressure within the vacuum box 2a. As the vacuum box 2a moves synchronized with the rotating member 25 of the suction station 5, an underpressure is thus created to the inside space 3 of the vacuum box 2a. An absolute pressure of 0.05 bar to 0.5 bar, preferably 0.05 bar to 0.15 bar is created within the vacuum box 2. Before the vacuum box 2a leaves the suction station 5, or just when it leaves the suction station, both check valves 9, 15 are closed, c.f. FIGS. 3, 13 and 14. When check valves 9, 15 are closed, no fluid (liquid, gas or other substance) can enter the inside 3 of the vacuum box 2 through the check valves 9, 15. Check valve 9 is closed when the pressure at the outlet of the check valve 9 is higher than the pressure at the inside space 3 of the vacuum box 2 the spring 46 providing an additional force to displace the blocking member 9a into the closed position (shown in FIG. 14). Spring 16 keeps check valve 15 closed when there is an underpressure within the vacuum box 2. The check valves 9, 15 enable to maintain an underpressure inside the vacuum box 2 when it travels from the suction station 5 to the discharge station 10.

Thanks to the high bubble-point of the filter 7 no air can pass the moist surface of the filter 7 and an underpressure inside the vacuum box 2 can be maintained even if the vacuum box 2 is not connected to the suction station 5. The underpressure inside the vacuum box 2 is not immediately lost after the vacuum box leaves the suction station 5, but each vacuum box is able to keep an underpressure ("vacuum") for a longer time without being connected to any suction source. Owing to this property, the vacuum box 2 can be called a vacuum accumulator. Owing to the underpressure within the vacuum box 2, a slurry will continuously be filtered when the vacuum box moves between the feed station 29 and the discharge station 10, i.e. without any fluid communication between the inside space 3 of the vacuum box 2 and the suction station 5. When the vacuum box 2 moves towards the discharge station 10 a filtrate, i.e. water or other liquid, is accumulated within the vacuum box 2. During filtration, water from the slurry is transported into the vacuum box 2 through the capillary action of the filter 7. At the same time a residue is collected and built up on the upper side of the vacuum box 2 on the upper side of the filter 7. As understood from the above, a differential pressure over the residue is created and maintained. When filtrate (water) enters the interior of the vacuum box 2, the volume of gas in the inside space 3 of the vacuum box will gradually decrease and consequently the absolute pressure within the vacuum box will increase. If, for example, the initial absolute pressure within the vacuum box 2 is 0.05 bar at the suction station 5, and the gas volume is reduced by for example 20% during filtration, the absolute pressure in the vacuum box 2 will increase to 0.25 bar.

The inside space 3 of the vacuum box 2 must have a certain gas volume; if the inside space 3 is full with water, no suction effect can be created to remove excess water from the vacuum box. A dewatering station 47a is positioned between the suction station 5 and the discharge station 10. The construction of the dewatering station 47a is similar to the concentration of the suction station 5. For sake of simplicity, the dewatering station 47a has in FIG. 1 been drawn as a box. At the dewatering station 47a filtrate can be removed from the inside space 3 of the vacuum box 2 by opening the check valve 15 and/or the check valve 9. Outlet 8 and the check valve 9 therein are the primary components for removal of filtrate. Removal of filtrate is needed if one wishes to maintain a sufficient vacuum level in the vacuum box 2 or build up an even stronger underpressure on a subsequent additional suction station, c.f. additional suction station 5b. The additional suction station 5b is of the same type as the suction station 5, i.e. it has a stationary distribution part (not shown), conduits, suction ends etc., like the suction station 5. As the additional suction station 5b typically can be used for removing filtrate from the vacuum boxes 2, it can be called a dewatering station. The location of the additional suction station 5b can be chosen relatively freely between the discharge station 10 and the feed station 29. The additional suction station 5b is not indispensable, but it makes the liquid-solid separation of slurry much faster. The filtrate removed from the vacuum boxes 2 can be used as cleaning medium in the backwash station 14 or for spraying the upper surface of the filters 7 for cleaning the vacuum boxes 2. Reference numeral 47b shows an additional dewatering station positioned between the additional suction station 5b and the discharge station 10. The construction of the additional dewatering station 47b is similar to the construction of the dewatering station 47a. The number of dewatering stations can vary; typically there is zero to three dewatering stations, preferably one to three dewatering stations in the vacuum belt filter.

The upper region of the belt 1 is inclined downward by preferably 1 degree to 10 degrees with respect to the horizontal downstream the suction station 5. The belt is inclined up to the location of the discharge station 10. Thanks to the inclination, slurry is not drift—at least to a higher extent—on the vacuum boxes 2 in a direction opposite to the travel direction of the belt 1. This prevents slurry from entering backwards to the suction station 5 and falling down downstream the suction station.

The moisture content of the residue can e.g. be 40% to 50% close to the feed station 5, and when the residue comes to the discharge station 10, the moisture content of the residue is 5 to 25% depending on nature and size of particles, and the residue is in the form of a filter cake. A low moisture content is especially of importance for example in filtering organic materials with high specific filtration resistance, such as biomass, organic waste or algae in energy production. The thickness of the filter cake can be dozens of millimeters when the vacuum box 2 enters the discharge station 10. The weight of the filter cake depends on filtering area, type of slurry etc.; it can e.g. be 5 kg when it enters the discharge station 10. At the discharge station 10 the residue is removed by the scrapers 11 and is discharged to the discharge container 31 underneath.

During its travel from the discharge station 10 to the backwash station 14 the upper surface of the filter 7 of the vacuum box 2 is preferably sprayed with wash fluid, typically water. Reference numeral 12 shows the spray means for carrying out said cleaning. The spray means 12 comprise nozzles for spraying water against the upper surface of the filter 7. The spraying pressure can be e.g. 5 bar to 10 bar. The water can be at least partly taken from one or more of the following stations: the dewatering station 47a, the additional suction station 5b, the additional dewatering station 47b, and the backwash station 14.

The vacuum boxes 2 are cleaned in the backwash station 14. The construction of the backwash station 14 is similar to the construction of the suction station, i.e. it comprises a non-rotatable stationary distribution part 48 corresponding to the stationary distribution part 32 of the suction station 5, and a rotating member 6 corresponding to the rotating member 25 of the suction station 5; it comprises a rotating distribution valve arrangement 17 having a construction which preferably is similar to the construction of the rotating suction arrangement 24 of the suction station 5. Accordingly, the rotating member 6 of the rotating distribution valve arrangement 17 comprises a rotating periphery 21 provided with a plurality of distribution ends 19 arranged along the entire periphery 21 of the rotating member 6, but for sake of simplicity only two distribution ends have been drawn in FIG. 1. The distribution ends 19 are arranged at a distance X from each other corresponding to the distance Y between the inlets 13 of adjacent vacuum boxes 2. The distribution ends 19 are adapted to be connected to the inlets 13 of the vacuum boxes 2 in order to feed wash fluid to the inside space 3 of the vacuum boxes 2. The rotating distribution valve arrangement 17 is provided with a valve system which is (as explained in more detail below) adapted to open fluid communication between a wash fluid source (possibly containing wash fluid from the dewatering station) and the distribution ends 19 only when the distribution ends 19 are connected to the inlets 13 of the vacuum boxes. The rotating member 6 of the rotating distribution valve arrangement 17 comprises further an inner rim 18 corresponding to the inner rim 44b of the rotating member 25 of the suction arrangement 5 and conduits (not shown) corresponding to conduits 35 of the rotating suction arrangement 24 of the suction arrangement 5. The opening (not shown) of the stationary distribution part 48 has a shape and curvature which corresponds to the shape and curvature of the inner rim 18 to provide effective fluid communication between the stationary distribution part 48 and the channels (not shown) in the rotating member 6. The inner rim 18 is preferably circular (like the inner rim 44b of the rotating member 25).

When the vacuum box 2 arrives at the backwash station 14, the inlet 13 of the vacuum box comes into contact with the distribution ends 19 of the backwash station 14. The distribution ends 19 are adapted to press the blocking member 15a of the check valve 15 so that the check valve 15 opens for enabling wash water to enter to the inside space 3 of the vacuum box 2. It is conceivable that the distribution ends 19 are adapted not to press the blocking member 15a but to press only against the inlet 13, which is possible if the pressure of the wash fluid is high enough to open the check valve 15 against the spring force of the check valve. In order to achieve effective back washing of the filter 7 by applying pressure against the clean surface, i.e. inside surface, thereof, the outlet 8 shall be closed at least partly so that water does not forcefully flow out from the outlet 8. The spring 46 in the outlet 8 partly serves for such closing. However, the spring 46 provides only for a minimal closing effect, because a low opening pressure for check valve 9 is wanted as a near absolute vacuum in to the vacuum box is strived at. The outlet 8 of the vacuum box 2 can, however, effectively be closed by a blocking element 20 arranged on a rotating periphery 21 of the rotating distribution valve arrangement 17. Said periphery is preferably the same periphery as the one having the distribution ends 19. Blocking elements 20 are arranged along the entire periphery 21 of the rotating distribution valve arrangement 17, but for sake of simplicity only two blocking elements have been drawn in FIG. 1. The blocking elements 20 are arranged at a distance L from each other corresponding to the distance T between the outlets 8 of adjacent vacuum boxes 2. The blocking elements 20 are adapted to engage the outlets 8 and close them forcefully to prevent wash fluid from flowing from the inside space 3 of the vacuum box out from the outlets 8 of the vacuum boxes 2. Alternatively, the blocking elements 20 are adopted to close the outlets 8 by closing the check valves 9. The check valves 9 can be forcefully closed when the blocking elements 20 are engaged with the check valves 9. If no blocking elements 20 are arranged in the outlets 8, wash fluid can freely flow out from the outlets 8 through the check valves 9. During backwashing, in such a situation the backwash of the filter 7 is not effective as no high pressure can be directed against the clean side of the filter 7. The backwash pressure should be higher than the differential pressure used in filtration. The cleaning of the vacuum boxes 2 can normally be carried out with an over-pressure of 1 to 2 bar.

Figure 2:
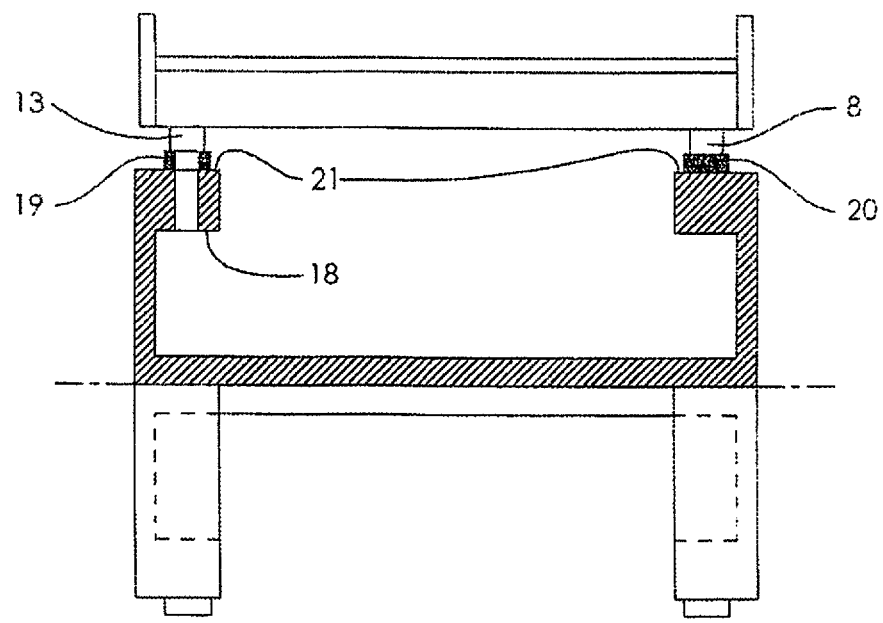
FIG. 2 illustrates a part of the backwash station of the vacuum belt filter of FIG. 1.

FIG. 2 illustrates the above described opening of inlets 13 by the aid of the distribution ends 19 of the distribution valve arrangement 17 and illustrates also the blocking of the outlets 8 with blocking elements 20 at the backwash station 14.

The vacuum boxes 2 pass a wash vat 22 arranged in connection with the backwash station 14. In order to effectively clean the filters 7 of the vacuum boxes 2, ultrasonic transducers 23 are arranged in the wash vat 22 for applying sound waves to the filters 7 of the vacuum boxes 2. When the vacuum boxes 2 leave the backwash station 14, they are clean and the pressure within the vacuum box 2 corresponds to the outside pressure. It is conceivable that the filters 7 of the vacuum boxes 2 are washed (cleaned) with acids. This is possible, because the filters 7 are made from a material which stands acids, e.g. a ceramic material such as $Al_2O_3$, SIC, aluminium silicate, and titania. The material of the filter can also be metal or plastic having the required mechanical strength and corrosion resistance.

Next, the vacuum boxes 2 arrive to the suction station 5 for being connected to the rotating distribution valve suction arrangement 24 of the suction station 5. In the suction station 5 an underpressure is created into the vacuum boxes 2 as described above.

By keeping the belt 1 continuously circulating between the suction station 5, feed station 29, discharge station 10 and the backwash station 14, solid-liquid separation is continuously carried out between the feed station 29 and the discharge station 10.

The vacuum belt filter is covered with a hood (not shown) if poisonous gases are formed in the liquid-solid separation carried out by the vacuum belt filter.

A list of components of the vacuum belt filter and the reference numerals used for the components is as follows:

- 1 belt
- 2 vacuum box
- 2*a* vacuum box
- 3 inside space of vacuum box
- 4 drive means
- 4*a* turn pulley
- 5 suction station
- 5*b* additional suction station (dewatering station)
- 6 rotating member of rotating distribution valve arrangement 17
- 7 capillary filter
- 8 outlet
- 9 spring loaded check valve
- 9*a* blocking member of check valve 9
- 10 discharge station
- 11 scrapers
- 12 spray means
- 13 inlet of vacuum box
- 14 backwash station
- 15 spring loaded check valve
- 15*a* blocking member of check valve 15
- 16 spring
- 17 rotating distribution valve arrangement
- 18 inner rim of rotating member 6
- 19 distribution ends
- 20 blocking element
- 21 rotating periphery of rotating valve distribution arrangement 17
- 22 wash vat
- 23 ultrasonic transducers
- 24 rotating suction arrangement (rotating distribution valve suction arrangement)
- 25 rotating member of rotating suction arrangement 24
- 25*a* periphery of rotating member 25
- 26 suction ends of rotating member 25
- 27 frame
- 28 drive chain
- 29 feed station
- 30 chute
- 31 discharge container
- 32 stationary distribution part
- 32*a* connection part of distribution part 32
- 33 shaft
- 34 suction port
- 34*a* suction opening of stationary distribution part 34
- 34*b* seals
- 35 conduit
- 35*a* first end of conduit 35
- 35*b* second end of conduit 35
- 36 bottom of vacuum box 2
- 37 long side of vacuum box 2
- 38 long side of vacuum box 2
- 39 end wall of vacuum box 2
- 40 end wall of vacuum box 2
- 41 top of vacuum box 2
- 42 shield
- 43 shield
- 44 distribution surface of rotating member 25
- 44*a* opening in distribution surface 44
- 44*b* inner rim of rotating member 25
- 45 vacuum source
- 46 spring
- 47*a* dewatering station
- 47*b* additional dewatering station
- 48 stationary distribution part
- 49 filter cake washing apparatus
- 50, 50' filter element
- 51, 51' first permeable filter surface
- 52, 52' support structure
- 52*a*, 52*b*, 52*a'*, 52*b'* support element
- 53, 53' second surface of filter 7, 7'
- 54, 54' support parts
- 55 connectors
- 56, 56' cavity
- 57, 57' holes
- 58 body part of vacuum box 2
- 59' brackets
- 60, 60', 60" intermediate ceramic layer
- 61" walls
- L distance between adjacent blocking elements 20
- S distance between outlets 8 of adjacent vacuum boxes 2
- T distance between outlets 8 of adjacent vacuum boxes 2
- U distance between adjacent openings 44*a* at distribution surface 44
- X distance between adjacent distribution ends 19
- Y distance between inlets 13 of adjacent vacuum boxes 2
- Z distance between adjacent suction ends 26.

Although the life time of the capillary filters 7 of the filter belt is expected to be long, the capillary filters must at some time be replaced when worn or broken. A major advantage with the belt filter of the present invention is that all capillary filters must not be replaced at the same time; it is expected to be sufficient that only one or a few capillary filters which have worn or broken are replaced. A worn or broken capillary filter can easily and fast be replaced by detaching from the belt 1 a respective vacuum box 2 having the worn or broken capillary filter and putting in its place on the belt 1 a new vacuum box having a new capillary filter. Alternatively, it is conceivable that the worn or broken capillary filter is detached from the vacuum box 2 while keeping the vacuum box attached to on the belt 1, and a new capillary filter is attached to the vacuum box on the belt.

As the check valves 9 of the vacuum boxes 2 wear in use or may break, they must at some time be replaced. Not all check valves of the vacuum boxes must not be replaced at the same time; only a check valve which is replaced. A worn or broken check valve 9 can be replaced by detaching from the belt 1 a respective vacuum box 2 having the worn or broken check valve and putting in its place on the belt 1 a new vacuum box having a new check valve. Alternatively, a worn or broken check valve 9 is detached from the vacuum box 2 while keeping the vacuum box attached to on the belt 1, and a new check valve is mounted to the vacuum box on the belt.

The method for carrying out liquid-solid separation of the slurry in the vacuum belt filter according to the invention comprises the essential method steps as follows:

building up the underpressure to the vacuum boxes 2 in the suction station 5 while moving the belt 1, closing the check valves 9 of the vacuum boxes 2 when the vacuum boxes leave the suction station 5 thus maintaining an underpressure in the inside space 3 of the vacuum boxes downstream the suction station, feeding the slurry or similar from the feed station 29 on the vacuum boxes 2 downstream the suction station while keeping underpressure within the vacuum boxes, letting filtrate enter the inside space 3 of the vacuum boxes 2 while keeping the belt 1 moving and building up a residue on the capillary filters 7, guiding the vacuum boxes 2 to the discharge station 10 and removing residue from the capillary filters 7 at the discharge station, and guiding the vacuum boxes 2 to the suction station 5 for rebuilding an underpressure to the inside space 3 the vacuum boxes.

The above essential steps are repeated. Preferably, the belt 1 with its vacuum boxes 2 travel in one and the same direction of travel in a circular motion the vacuum boxes thus forming an endless belt and a closed loop, whereby the separation process preferably is continuous. In such a process the suction station 5 is positioned downstream the discharge station 10 (seen in the direction of the moving belt 1). Alternatively, the belt 1 (with its vacuum boxes 2) can be moved intermittently back and forth. However, moving the belt 1 intermittently is considered not to be very effective in comparison with a continuous process where the belt moves continuously in one and the same direction; an intermittent process requires also a modification for the lay out of the components of the vacuum belt filter shown in the drawings.

Naturally, the filtrate must at times be removed from the inside space 3 of the vacuum boxes 2.

Preferably the method for carrying out liquid-solid separation of the slurry in the vacuum belt filter comprises additionally the steps of backwashing the boxes and preferably also spraying cleaning fluid, typically water, on the upper surface of the capillary filters 7. Such backwashing and spraying is carried out between the discharge station 10 and the suction station 5 preferably as the belt 1 moving.

The invention has been disclosed above by means of preferred embodiments only, and therefore it is to be noted that the details of the invention may be implemented in many different ways within the scope of the accompanying independent claims. Thus, for instance, it is feasible that each vacuum box has no inlet which is separate from the outlet. The suction station does is not necessarily of the type comprising a rotating member having a plurality of suction ends, although this is highly preferable. The distribution surface (44) of the suction station (5) need not to be formed on an inner rim (44b) of the rotating member (25) of the rotating suction arrangement (24), but can e.g. be an end surface which is perpendicular to the central axis of the rotating member (25). The number of conduits (35) in the rotating member (25) can vary. Spray means (12) between the discharge station (10) and the backwash station (14) are optional. The vacuum belt filter need not necessarily have a backwash station (14) although it is highly recommendable. When a backwash station (14) is present, the components of the backwash station can vary; e.g. transducers are not necessary for cleaning the filters and vacuum boxes; it is conceivable to clean the filters with an acid. The number of vacuum boxes and the length of the belt can largely vary depending on application. An endless belt (1) is the most practical solution as all unit processes involved in the filtration cycle can be stationary organized. As mentioned earlier, the belt (1) need not be an endless belt although an endless belt is highly recommendable; thus, the belt can be a belt arranged to move intermittently back and forth, whereby the vacuum boxes move intermittently between the suction station (5) and the discharge station (10). A reciprocating process, however, is a complicated solution and it may typically also not be continuous, which may weaken the efficiency of the liquid-solid separation process. The number of backwash stations (14) can vary. One or more filter cake washing apparatuses (49) positioned upstream the discharge station (10) can be included in the vacuum belt filter. If the vacuum belt filter comprises a cake washing apparatus and an additional suction station (5b), the latter should be positioned downstream the cake washing apparatus so that water sprayed on the filter cake has time to be absorbed into the filter cake and through the filter cake to the inside space (3) of the vacuum box (2); and the water can subsequently be removed from the inside space (3) through the outlet (8) of the vacuum box (2).

According to aspect 1, in a vacuum box (2) for a vacuum belt filter, the vacuum box comprising an inside space (3) for receiving a filtrate, the vacuum box (2) comprises a capillary filter (7), and the vacuum box (2) being provided with an outlet (8) having a check valve (9) enabling a fluid flow from the inside space (3) of the vacuum box (2) to the outside of the vacuum box (2) for creating an underpressure in the vacuum box (2), the vacuum box being capable of maintaining said underpressure within its inside space (3) without being connected to a vacuum source, and the check valve (9) preventing a fluid flow to the inside space (3) of the vacuum box.

According to aspect 2, in a vacuum box (2) according to aspect 1, the check valve (9) of the outlet (8) comprises a mechanical actuator for closing a blocking member (9a) of the check valve.

According to aspect 3, in the vacuum box (2) according to aspect 1 or 2, the filter (7) is a stiff capillary filter.

According to aspect 4, in the vacuum box (2) according to any preceding aspect 1 to 3, the pore size of the capillary filter is 0.03 µm to 5 µm.

According to aspect 5, in the vacuum box (2) according to any preceding aspect 1 to 4, the capillary filter (7) is a ceramic filter.

According to aspect 6, in the vacuum box (2) according to any preceding aspect 1 to 5, the vacuum box is provided with an inlet (13) for feeding wash fluid to the inside space (3) of the vacuum box and on the clean side of the capillary filter (7).

According to aspect 7, in the vacuum box (2) according to aspect 6, the inlet (13) comprises a check valve (15) comprising a mechanical actuator for closing a blocking member (15a) of the check valve, the mechanical actuator keeping the blocking member (15a) of the check valve (15) and the check valve (15) in a closed position when a pressure acting from the outside of the vacuum box (2) against the blocking member (15a) and against a force of the mechanical actuator is smaller than the sum of the force of the mechanical actuator and the pressure acting from the inside (3) of the vacuum box (2) on the blocking member (15a); and the check valve (15) opening when the pressure acting from the outside of the vacuum box (2) against the blocking member (15a) and against the mechanical actuator is bigger than the sum of the force of the mechanical actuator and the pressure acting from the inside (3) of the vacuum box (2) on the blocking member (15a).

According to aspect 8, in the vacuum belt filter comprising a belt (1) with a plurality of vacuum boxes (2) arranged one after another, filter means being arranged to the vacuum boxes, each vacuum box defining an inside space (3) for receiving a filtrate, the vacuum belt filter further comprising drive means (4) for moving the belt (1), and a suction station (5) comprising suction means connectable to outlets (8) of the vacuum boxes (2) for creating in relation to a surrounding pressure an underpressure to the vacuum boxes at the suction station (5), wherein the vacuum boxes each comprise a capillary filter (7), the outlet (8) of each vacuum box being provided with a check valve (9) enabling a fluid flow from the inside space (3) of the vacuum box to the outside of the vacuum box for creating and maintaining an underpressure in the vacuum box when the suction station (5) is connected to the outlet (8) of the vacuum box, the check valve (9) preventing a fluid flow through the check valve to the inside space (3) of the vacuum box when the vacuum box leaves the suction station (5) thereby maintaining the vacuum box under underpressure in relation to the surrounding pressure when the vacuum box becomes outside influence of the suction station.

According to aspect 9, in the vacuum belt filter according to aspect 8, the suction station (5) comprises a non-rotatable stationary distribution part (32) and that the suction means comprises a rotating distribution valve suction arrangement (24), the stationary distribution part (32) comprising a suction port (34) having a suction opening (34a), and the rotating distribution valve suction arrangement (24) comprising a rotating member (25) having a plurality of suction ends (26) connectable to the outlets (8) of the vacuum boxes (2), the suction ends (26) being peripherically (25a) arranged at the rotating member (25), a plurality of adjacent openings (44a) being provided at a distribution surface (44) of the rotating member (25), the openings (44a) being arranged at a distance (U) from one another and the rotating member (25) further comprising a plurality of conduits (35) each having a first end (35a) being in fluid communication with a suction end (26) of the plurality of suction ends of the rotating member, and a second end (35b) being in fluid communication with an opening (44a) of the plurality of openings of the rotating member (25), the suction opening (34a) of the stationary distribution part (32) facing only one or some of the openings (44a) of the distribution surface (44) so that the one or some of the openings of the distribution surface (44) comes into fluid communication with the suction opening (34a) at intervals when the rotating member (25) and the distribution surface (44) thereof are rotating in relation to the stationary distribution part (32).

According to aspect 10, in the vacuum belt filter according to aspect 9, the distribution surface (44) is formed of an inner rim (44b) of the rotating member (25).

According to aspect 11, in the vacuum belt filter according to aspect 9 or 10, the vacuum belt filter comprises a discharge station (10) downwards the suction station (5), the discharge station comprising scrapers (11) for removing residue from the capillary filters (7).

According to aspect 12, in the vacuum belt filter according to aspect 11, a filter cake washing apparatus (49) for washing filter cakes formed on the vacuum boxes (2) is provided.

According to aspect 13, in the vacuum belt filter according to aspect 11 or 12, the vacuum belt filter comprises downstream the discharge station (10) spray means (12) for cleaning the outside surface of the capillary filters (7).

According to aspect 14, in the vacuum belt filter according to any preceding aspect 11 to 13, the vacuum belt filter comprises a backwash station (14) for feeding wash fluid to the inside space (3) of the vacuum boxes (2), the vacuum boxes (2) each comprising an inlet (13) for receiving from the backwash station (14) the wash fluid and for feeding the wash fluid to the inside space (3) of the vacuum box and on the clean side of the capillary filter (7).

According to aspect 15, in the vacuum belt filter according to aspect 14, the backwash station (14) comprises a rotating distribution valve arrangement (17) having a rotating member (6) having a rotating periphery (21) provided with a plurality of distribution ends (19) for feeding backwash fluid to the inside space (3) of the vacuum boxes (2) and on the clean side of the capillary filter (7) of the vacuum boxes, the distribution ends (19) being arranged at a distance (X) from each other corresponding to the distance (Y) between the inlets (13) of adjacent vacuum boxes (2), the distribution ends (19) being adapted to be connected to the inlets (13) of the vacuum boxes (2) in order to feed wash fluid to the inside space (3) of the vacuum boxes (2).

According to aspect 16, in the vacuum belt filter according to aspect 15, the backwash station (14) comprises a non-rotatable stationary distribution part (48) and that the rotating member (6) of the rotating distribution valve arrangement (17) comprises conduits for providing fluid connection between the non-rotatable stationary distribution part (48) and the distribution ends (19) of the distribution valve arrangement (17).

According to aspect 17, in the vacuum belt filter according to aspect 15 or 16, the rotating distribution valve arrangement (17) comprises blocking elements (20) arranged at the rotating periphery (21) of the rotating distribution valve arrangement, the blocking elements (20) being arranged at a distance (L) from each other corresponding to the distance (T) between the outlets (8) of adjacent vacuum boxes (2), the blocking elements (20) being adapted to close the check valves (9) to prevent fluid from flowing out from the outlets (8) of the vacuum boxes when the blocking elements (20) are engaged with the check valves (9).

According to aspect 18, in the vacuum belt filter according to any preceding aspect 15 to 17, the vacuum boxes (2) are arranged to pass a washing vat (22) provided with ultrasonic transducers (23) for applying sound waves to the filters (7) of the vacuum boxes (2).

According to aspect 19, in the vacuum belt filter according to any preceding aspect 14 to 18, the vacuum belt filter comprises a dewatering station (47a) for emptying the vacuum boxes (2) from filtrate, and conduits for leading the filtrate from the dewatering station to the backwash station (14) or to spray means (12), which are arranged between the discharge station (10) and the backwash station (14) for spraying filtrate against an upper side of the vacuum boxes (2) the belt (1).

According to aspect 20, in the vacuum belt filter according to any preceding aspect 8 to 17, the belt (1) of the vacuum belt filter is an endless belt.

According to aspect 21, in the vacuum belt filter according to aspect 11, 12 or 13, the belt (1) is arranged to move along an endless track in one direction from the suction station (5) to the discharge station (10) and back to the suction station (5).

According to aspect 22, in the vacuum belt filter according to aspect 20 or 21, the belt (1) comprises an upper region which is inclined downwards downstream the suction station (5) in the direction of the motion of the belt.

According to aspect 23, in the vacuum belt filter according to any preceding aspect 8 to 22, the vacuum belt filter comprises drive means (4) for moving the drive belt (1), the drive means comprising an electric motor.

According to aspect 24, in the vacuum belt filter according to any preceding aspect 8 to 22, the vacuum belt filter comprises drive means (4) for moving the drive belt (1), the drive means comprising a hydraulic motor.

According to aspect 25, in the vacuum belt filter according to any preceding aspect 8 to 24 comprises a turn pulley (4a) for moving the belt (1).

According to aspect 26, in the vacuum belt filter according to any preceding aspect 9 to 20, the vacuum boxes (2) are arranged to move in a reciprocating manner between the suction station (5) and the discharge station (10).

According to aspect 27, in the vacuum belt filter according to aspect 15, the belt (1) is an endless belt and in that the vacuum boxes (2) are arranged to move from the suction station (5) to the discharge station (10), from the discharge station (10) to the backwash station (14) and from the backwash station (14) to the suction station (5).

According to aspect 28, in a method for servicing a vacuum belt filter comprising a belt (1) with a plurality of vacuum boxes (2) arranged one after another, filter means being arranged to the vacuum boxes, each vacuum box defining an inside space (3) for receiving a filtrate, the vacuum belt filter further comprising drive means (4) for moving the belt (1), and a suction station (5) comprising suction means connectable to outlets (8) of the vacuum boxes (2) for creating in relation to a surrounding pressure an underpressure to the vacuum boxes at the suction station (5), wherein the vacuum boxes each comprise a capillary filter (7), the outlet (8) of each vacuum box being provided with a check valve (9) enabling a fluid flow from the inside space (3) of the vacuum box to the outside of the vacuum box for creating and maintaining an underpressure in the vacuum box when the suction station (5) is connected to the outlet (8) of the vacuum box, the check valve (9) preventing a fluid flow through the check valve to the inside space (3) of the vacuum box when the vacuum box leaves the suction station (5) thereby maintaining the vacuum box under underpressure in relation to the surrounding pressure when the vacuum box becomes outside influence of the suction station, the step of servicing comprising:

detaching a worn or broken capillary filter (7), to be replaced, from the belt (1) and replacing it with a new capillary filter.

According to aspect 29, a method according to aspect 28 is characterized by detaching the worn or broken capillary filter (7) from a vacuum box (2) and attaching the new capillary filter to the vacuum box (2).

According to aspect 30, a method according to aspect 29 is characterized by keeping the vacuum box (2) attached to the belt (1) while replacing the capillary filter of the vacuum box.

According to aspect 31, a method according to aspect 28 is characterized by detaching from the belt (1) a respective vacuum box (2) having the worn or broken capillary filter (7) and replacing this vacuum box (2) with another, new vacuum box having a new filter, the replacing comprising the step of mounting the vacuum box with the new capillary filter to the belt (1).

According to aspect 32, in a method for servicing a vacuum belt filter comprising a belt (1) with a plurality of vacuum boxes (2) arranged one after another, filter means being arranged to the vacuum boxes, each vacuum box defining an inside space (3) for receiving a filtrate, the vacuum belt filter further comprising drive means (4) for moving the belt (1), and a suction station (5) comprising suction means connectable to outlets (8) of the vacuum boxes (2) for creating in relation to a surrounding pressure an underpressure to the vacuum boxes at the suction station (5), wherein the vacuum boxes each comprise a capillary filter (7), the outlet (8) of each vacuum box being provided with a check valve (9) enabling a fluid flow from the inside space (3) of the vacuum box to the outside of the vacuum box for creating and maintaining an underpressure in the vacuum box when the suction station (5) is connected to the outlet (8) of the vacuum box, the check valve (9) preventing a fluid flow through the check valve to the inside space (3) of the vacuum box when the vacuum box leaves the suction station (5) thereby maintaining the vacuum box under underpressure in relation to the surrounding pressure when the vacuum box becomes outside influence of the suction station, the step of servicing comprises:

detaching a worn or broken check valve (9), to be replaced, from the belt (1) and replacing it with a new check valve.

According to aspect 33, a method according to aspect 32 is characterized by detaching the worn or broken check valve (9) from a vacuum box (2) and mounting the new check valve to the vacuum box (2).

According to aspect 34, a method according to aspect 33 is characterized by keeping the vacuum box (2) attached to the belt (1) while replacing the check valve (9) of the vacuum box.

According to aspect 35, a method according to aspect 32 is characterized by detaching from the belt (1) a respective vacuum box (2) having the worn or broken check valve (9) and replacing this vacuum box (2) with another, new vacuum box having the new check valve, the replacing comprising the step of mounting the vacuum box with the new check valve to the belt (1).

According to aspect 36, in a method for carrying out liquid-solid separation of a slurry or similar in a vacuum belt filter comprising a belt (1) with a plurality of vacuum boxes (2) arranged one after another, filter means being arranged to the vacuum boxes, each vacuum box defining an inside space (3) for receiving a filtrate, the vacuum belt filter further comprising drive means (4) for moving the belt (1), and a suction station (5) comprising suction means connectable to outlets (8) of the vacuum boxes (2) for creating in relation to a surrounding pressure an underpressure to the vacuum boxes at the suction station (5), wherein the vacuum boxes each comprise a capillary filter (7), the outlet (8) of each vacuum box being provided with a check valve (9) enabling a fluid flow from the inside space (3) of the vacuum box to the outside of the vacuum box for creating and maintaining an underpressure in the vacuum box when the suction station (5) is connected to the outlet (8) of the vacuum box, the check valve (9) preventing a fluid flow through the check valve to the inside space (3) of the vacuum box when the vacuum box leaves the suction station (5) thereby maintaining the vacuum box under underpressure in relation to the surrounding pressure when the vacuum box becomes outside influence of the suction station, and downstream the suction station (5) a discharge station (10) for removal of residue from the capillary filters (7), the method comprises the steps of building up the underpressure to the vacuum boxes (2) in the suction station (5) while moving the belt (1), closing the check valves (9) of the vacuum boxes (2) when the vacuum boxes leave the suction station (5) thus maintaining an underpressure in the inside space (3) of the vacuum boxes (2) downstream the suction station, feeding the slurry or similar from a feed station (29) on the vacuum boxes (2) downstream the suction station (5) while keeping underpressure within the vacuum boxes (2), letting filtrate enter the inside space (3) of the vacuum boxes (2) while keeping the belt (1) moving and building up a residue on the capillary filters (7), guiding the vacuum boxes (2) to the discharge station (10) and removing residue from the capillary filters (7) at the discharge station, and guiding the vacuum boxes (2) to the suction station (5) for rebuilding an underpressure to the inside space 3 of the vacuum boxes.

According to aspect 37, a method according to aspect 36 is characterized by the belt (1) forming an endless loop whereby the belt is moved in a circular motion in one and the same direction of travel.

According to aspect 38, a method according to aspect 36 is characterized by moving the belt (1) back and forth between the suction station (5) and the discharge station (10).

According to aspect 39, a method according to aspect 36, 37 or 38 comprises the steps of building up the residue on the capillary filters (7) in the form of a filter cake and washing the filter cake.

According to aspect 40, a filter element (50, 50', 50", 501 for a vacuum box of a vacuum belt filter is characterized by comprising a capillary filter (7, 7', 7", 7''') comprising a first permeable filter surface (51, 51', 51", 51''') for receiving a feed, a second surface (53, 53', 53") of the capillary filter being opposite to the first filter surface, and a support structure (52, 52', 52") for supporting the second surface of the capillary filter, the support structure being permanently attached to the second surface of the capillary filter.

According to aspect 41, in a filter element according to aspect 40, the support structure (52, 52') defines a cavity (56, 56'), a plurality of support parts (54, 54') for supporting the second surface (53, 53',) of the capillary filter (7, 7') being arranged in the cavity.

According to aspect 42, in a filter element according to aspect 41, the support structure (52, 52') comprises the support parts (54, 54'), the support parts being spaced from one another.

According to aspect 43, a filter element according to aspect 41 or 42 is characterized in that the number of support parts (54, 54') is 50 to 4000 per square meter.

According to aspect 44, in a filter element according to aspect 41, 42 or 43, the support structure (52) comprises connectors (55) for connecting each support part (54) to at least one other support part.

According to aspect 45, in a filter element according to any preceding aspect 41 to 43, the support structure (52') comprises a first support element (52a') and a second support element (52b') for supporting the support parts (54'), the support parts (54') being located between the second support element (52b') and the second surface (53') of the capillary filter (7').

According to aspect 46, in a filter element according to aspect 45, the second support element (52b') is a planar element.

According to aspect 47, in a filter element according to aspect 45 or 46, the second support element (52b') comprises a plurality of holes (57') for transfer of filtrate off the filter element (50').

According to aspect 48, in a filter element according to aspect 40, the support structure (52") is a honeycomb structure.

According to aspect 49, in a filter element according to any preceding aspect 40 to 48, the support structure (52, 52', 52") facing the second surface (53, 53', 53") of the capillary filter (7, 7', 7") forms support surfaces against the second surface of the capillary filter, which support surfaces amount to 5 percent to 60 percent of a total area of the second surface of the capillary filter.

According to aspect 50, in a filter element according to any preceding aspect 40 to 49, at least a part of the second surface (53, 53') of the capillary filter (7, 7', 7") to which the support structure (52, 52', 52") is permanently attached, comprises a rough joining interface having a grit number of 40 to 180, the support structure being fastened to the rough joining interface.

According to aspect 51, in a filter element according to aspect 50, between the support structure (52, 52', 52") and the rough joining interface are one or more glue layers which attach the support structure permanently to the rough joining interface and the second surface (53, 53', 53") of the capillary filter (7, 7', 7").

According to aspect 52, in a filter element according to aspect 50, between the support structure (52, 52', 52") and the joining interface are one or more melt layers comprising a material of the support structure, which melt layers attach the support structure permanently to the rough joining interface and the second surface (53, 53', 53") of the capillary filter (7, 7', 7") so that the support structure is formed as a unit with the capillary filter.

According to aspect 53, a filter element according to any preceding aspect 40 to 48 is characterized by an intermediate ceramic layer (60, 60', 60") between the second surface (53, 53') of the capillary filter (7, 7', 7") and the support structure (52, 52', 52"), the intermediate ceramic layer (60, 60', 60") comprising a first surface facing the second surface of the capillary filter, and a second surface opposite to the first surface of the intermediate ceramic layer (60, 60', 60"), the second surface of the intermediate ceramic layer (60, 60', 60") facing the support structure (52, 52', 52") and comprising a rough joining interface, the first surface of the intermediate ceramic (60, 60', 60") layer being permanently fastened to the second surface (53, 53') of the capillary filter (7, 7', 7"), and the support structure (52, 52', 52") being permanently fastened to the rough joining interface.

According to aspect 54, in a filter element according to aspect 53, the rough joining interface of the second surface of the intermediate ceramic layer (60, 60', 60") has grit number of 40 to 300.

According to aspect 55, in a filter element according to aspect 54, the support structure (52, 52', 52") facing the second surface of the intermediate ceramic layer (60, 60', 60") forms support surfaces against the second surface of the intermediate ceramic layer, which support surfaces amount to 5 to 60 percent of a total area of the second surface of the capillary filter (7, 7', 7").

According to aspect 56, in a filter element according to aspect 54 or 55, between the support structure (52, 52', 52") and the joining interface are one or more glue layers which attach the support structure permanently to the second surface of the intermediate ceramic layer (60, 60', 60").

According to aspect 57, in a filter element according to any preceding aspect 54 to 55, between the support structure (52, 52', 52") and the joining interface are one or more melt layers comprising a material of the support structure, which melt layers attach the support structure permanently to the second surface of the intermediate ceramic layer (60, 60', 60").

According to aspect 58, in a filter element according to any preceding aspect 53 to 57, the thickness of the support structure (52, 52', 52") is 5 mm to 200 mm.

According to aspect 59, in a filter element according to any preceding aspect 53 to 58, the thickness of the intermediate ceramic layer (60, 60', 60") is 5 mm to 40 mm.

According to aspect 60, in a filter element according to aspect 40, the capillary filter (7") is ceramic and the support structure (521 is a porous ceramic brick, the pore size of the capillary filter being smaller than the pore size of the brick.

According to aspect 61, in a filter element according to aspect 60, the ceramic brick has a grit number of 40 to 300.

According to aspect 62, in a filter element according to aspect 60 or 61, the thickness of the brick is 10 mm to 100 mm.

According to aspect 63, in a filter element according to any preceding aspect 40 to 62, the thickness of the capillary filter is 0.1 mm to 10 mm.

According to aspect 64, in a filter element according to any preceding aspect 40 to 63, the width of the capillary filter (7, 7', 7", 71 is 0.1 m to 0.3 m, the length of the capillary filter is 1.5 m to 3 m, and the length is 5 to 10 times the width of the capillary filter.

The invention claimed is:

1. A vacuum box configured to form a part of an endless belt of a vacuum belt filter, the vacuum box comprising:
   a vacuum body defining an inside space configured to receive a filtrate;
   a capillary filter disposed on the vacuum body to form an upper surface of the vacuum box, the capillary filter being configured to collect residue in the form of a filter cake on the upper surface of the vacuum box; and
   an outlet coupled to the vacuum body and having a check valve configured to enable a fluid flow from the inside space of the vacuum body to an outside of the vacuum body for creating an underpressure in the vacuum body, the vacuum body being configured to maintain the underpressure within the inside space without being connected to a vacuum source, and the check valve being configured to prevent a fluid flow to the inside space, wherein the check valve includes a blocking member disposed in a blocking position when there is underpressure within the inside space of the vacuum body, enabling maintaining the underpressure in the inside space of the vacuum body when the vacuum body is not connected to a vacuum source, and opened from the blocking position when the vacuum body is connected to the vacuum source to enable the fluid flow from the inside space of the vacuum body to the outside of the vacuum body for creating the underpressure in the vacuum body.

2. The vacuum box according to claim 1, wherein the check valve of the outlet comprises a mechanical actuator for closing the blocking member of the check valve.

3. The vacuum box according to claim 1, wherein a pore size of the capillary filter is 0.03 μm to 5 μm.

4. The vacuum box according to claim 1, wherein the capillary filter is a ceramic filter.

5. The vacuum box according to claim 1, wherein the vacuum box is provided with an inlet for feeding wash fluid to the inside space of the vacuum box and on the clean side of the capillary filter.

6. The vacuum box according to claim 5, wherein the inlet comprises a check valve comprising a mechanical actuator for resiliently biasing a blocking member of the check valve toward a closed position to inhibit fluid from flowing into the inside space via the inlet, the mechanical actuator keeping the blocking member of the check valve and the check valve in a closed position when a pressure acting from the outside of the vacuum box against the blocking member and against a force of the mechanical actuator is smaller than the sum of the force of the mechanical actuator and the pressure acting from the inside of the vacuum box on the blocking member wherein the check valve opens when the pressure acting from the outside of the vacuum box against the blocking member and against the mechanical actuator is bigger than the sum of the force of the mechanical actuator and the pressure acting from the inside of the vacuum box on the blocking member.

7. The vacuum box according to claim 1, wherein the vacuum body includes:
   a bottom having first and second short sides and first and second long sides, the outlet extending from the bottom;
   first and second opposing long walls extending upwardly from the respective first and second long sides of the bottom; and
   first and second opposing end walls extending upwardly from the respective first and second short sides of the bottom, wherein the capillary filter, the bottom, the first and second long walls, and the first and second end walls together define the inside space.

8. The vacuum box according to claim 7, wherein the first and second end walls taper towards the bottom.

9. The vacuum box according to claim 7, further comprising first and second lateral shields extending upwardly from the respective first and second end walls and terminating above the upper surface of the vacuum box.

10. The vacuum box according to claim 7, wherein the capillary filter is suspended above the bottom such that the inside space is defined between the capillary filter and the bottom.

11. The vacuum box according to claim 7, wherein the capillary filter includes:
    a first permeable filter surface; and
    a second surface opposite the first permeable filter surface.

12. The vacuum box according to claim 11, further comprising a replaceable filter element including:
    the capillary filter; and
    a first support structure supporting the second surface of the capillary filter.

13. The vacuum box according to claim 12, wherein the replaceable filter element further includes an intermediary layer permanently attached to the second surface of the capillary filter for coupling the first support structure to the second surface.

14. The vacuum box according to claim 13, further comprising a second support structure fixed to a top of each of the first and second long walls and the first and second end walls.

* * * * *